United States Patent [19]

Minks

[11] 3,757,199
[45] Sept. 4, 1973

[54] POWER SUPPLY REGULATOR

[76] Inventor: Floyd M. Minks, Rt. 1, Box 41, Kissimmee, Fla.

[22] Filed: Nov. 16, 1971

[21] Appl. No.: 199,388

Related U.S. Application Data

[63] Continuation of Ser. No. 817,787, April 21, 1969, abandoned.

[52] U.S. Cl. .................. 322/28, 315/83, 322/91, 323/22 SC, 323/40, 323/75 L
[51] Int. Cl. .............................................. H02p 9/30
[58] Field of Search ................... 315/82, 83, 191; 323/22 SCR, 40, 75 N, 75 L, 81; 322/28, 91

[56] References Cited
UNITED STATES PATENTS

| | | | |
|---|---|---|---|
| 3,538,427 | 11/1970 | Oltendorf | 323/40 X |
| 3,471,769 | 10/1969 | Roesel, Jr. | 322/28 |
| 3,530,366 | 9/1970 | Schwarm | 322/91 X |
| 3,260,917 | 7/1966 | Shimwell et al. | 322/91 UX |

*Primary Examiner*—J. D. Miller
*Assistant Examiner*—H. Huberfeld
*Attorney*—Rives & Rives and Shapiro & Shapiro

[57] ABSTRACT

This disclosure relates to a snowmobile lighting system having a permanent magnet alternator with a preselected open circuit voltage connected to energize a pair of taillights and a dual filament headlight. A silicon controlled rectifier is connected across the alternator output. A resistance bridge network is also connected across the output of the alternator with one leg of the bridge type network including the taillights. A transistor has its input elements connected across the output terminals of the network and its output elements connected to the gate circuit of the controlled rectifier. The resistance of the taillights increases with the output of the alternator and when it rises about a selected level, the transistor conducts and fires the controlled rectifier. A cutoff switch is connected in parallel with the resistor of the bridge connected to the taillights to directly connect the taillights across the alternator to minimize the output of the alternator. A multiple position switch selectively connects either or both of the filaments of the headlight for bright, dim, or minimal energization, respectively.

16 Claims, 3 Drawing Figures

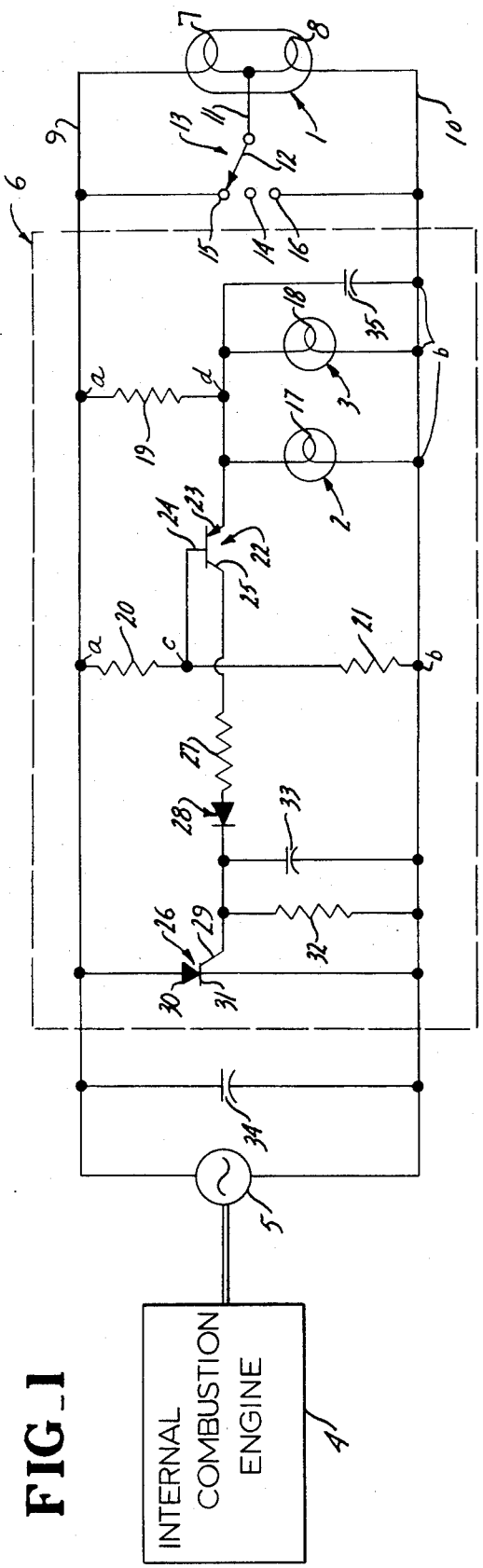

POWER SUPPLY REGULATOR

This is a continuation of application Ser. No. 817,787, filed Apr. 21, 1969 now abandoned.

This invention relates to an alternator power supply regulator and particularly to a lighting system having an alternator with a preselected output connected to energize a lighting means.

Motor vehicles are generally provided with headlights and taillights of the incandescent variety having filaments mounted in a seal glass shell. In certain vehicles, such as motorcycles and snowmobiles and the like, the lights are connected directly to the output of an alternator which is driven from the internal-combustion engine. A permanent magnet alternator provides an inexpensive and satisfactory commercial construction. Generally, however, the output of such alternators varies with the engine speed and thus the effectiveness of the lighting varies with the speed and does not provide a constant illuminating level. If the alternator is constructed to provide suitable illumination level at low speeds, the increased output at high speeds results in excessive illumination. Further, the incandescent type light is extremely sensitive to the operating voltage and operation above the rated voltage may result in rapid deterioration of the lighting components and under certain conditons may destroy them. Conversely, if the proper illumination level is provided at high speeds, the illumination is generally inadequate at low speeds.

The present invention is particularly directed to a simple and inexpensive regulator connected across the output of the alternator and responsive to the energization of the lighting means to maintain a relatively constant illumination level.

Generally, in accordance with the present invention, the lighting means have filaments which establish an impedance related to the energization level thereof and constitutes a power sensitive impedance means. The lighting means is connected as a part of a voltage dividing network connected across the output of the alternator. This results in a voltage signal which is a function of the energization of the lighting means and therefore the illumination level. This voltage signal is applied to control a triggered switch means such as a solid state electronic switch means connected directly across the output of the alternator. The alternator is a permanent magnet type or the like having a preselected short circuit current with the output dropping essentially to zero in response to short circuiting of the alternator or to a low impedance path across the alternator. The voltage dividing network is connected to selectively fire the triggered switch means when the RMS (root means square) value of the voltage output of the alternator rises above the normal energizing level of the lighting means and thus maintains a relatively constant level of energization.

In a particularly novel and reliable system, a controlled rectifier or the like is connected as the triggered switch means. A bridge-type resistance network is connected across the output of the alternator with one leg of the bridge-type network including the taillights. An amplifying means, such as a transistor, has its input elements connected across the output terminals of the network and its output elements connected in the gate firing circuit of the controlled rectifier. In the operation, the resistance of the leg of the bridge including the taillights increases with the RMS value of the output of the alternator and also with the lighting of the taillights and thus defines the power sensitive impedance means. If the voltage should rise above the normal energizing level, the transistor is biased on and provides a firing signal to the controlled rectifier to thereby remove the output. The thermal time constant of the taillights is substantially greater than the period of the alternator. The taillights thus provide a power sensitive impedance means with an effective averaging or in some instances phase type control.

Although the circuit regulator may not always provide a highly accurate phase control of the alternator output, it has been found to provide a sufficient control to maintain a relatively constant energization of the taillights and the headlight. If it is desired to turn off the energization of the lighting means, a cutoff switch may be provided in the network to connect the taillights or to by-pass a portion of the network and directly connect the taillights across the alternator. This provides a continuous signal to the transistor for a relatively insignificant output of the alternator and maintains a gate signal on the control rectifier such that the output of the alternator is essentially held at zero.

In motorcycles, snowmobiles and similar circuits, it is often desirable to maintain continuous energization of the headlights during both night and day operation. The energizing of the filaments prevents damage as a result of vibration and the like. The energization during the day period can, however, be substantially reduced over the illumination required for nighttime use. A multiple switching may be provided to selectively connect the filaments of the headlight for the normal, bright and dim energization. Additionally, in accordance with the present invention, the several filaments of the headlight may be selectively connected in series or in parallel across the output of the alternator to provide the desired daytime illumination level.

The present invention has been found to provide a reliable and inexpensive voltage light regulator for alternator driven lighting systems.

The drawing furnished herewith illustrates the best mode presently contemplated by the inventor for carrying out the invention and disclosed the above advantages and features as well as others which will be readily understood from the following description.

In the drawing:

FIG. 1 is a schematic circuit diagram of a light regulator constructed in accordance with the present invention and forming a part of a lighting system suitable for a snowmobile, motorcycle and the like;

FIG. 2 is a schematic circuit diagram showing an alternative headlight connection for the lighting system shown in FIG. 1; and FIG. 3 is a similar schematic circuit diagram of further alternative circuit connection.

Referring to the drawing and particularly to FIG. 1, the present invention is shown applied to an alternator supplied lighting system for a motorcycle, snowmobile or other device having a headlight 1 and a pair of taillights 2 and 3. An internal-combustion engine 4 is connected to drive an alternator 5 which in turn is interconnected to energize the headlight 1 and to the taillights 2 and 3.

The alternator 5 is preferably of a permanent magnet type for practical commercial reasons and the output is thus dependent upon the speed of the internal-combustion engine 4.

The energization level of the headlight 1 and the taillights 2 and 3 is controlled in accordance with the present invention to provide a relatively constant level of illumination by the headlight 1.

More particularly in the illustrated embodiment of the invention, the headlight 1 is shown as a dual element unit, such as presently widely employed in motorcycles and snowmobiles. Generally, the headlight 1 includes a high beam filament 7 and a low beam filament 8. The filaments 7 and 8 are series-connected across the alternator output lines 9 and 10 in FIG. 1. The junction of the filaments 7 and 8 provides a center tap 11 which is interconnected to the contact arm 12 of a three-position switch unit 13 for selective connection of the filaments 7 and 8 to lines 9 and 10.

The switch unit 13 includes a centrally located dead contact 14. When the contact 12 is positioned in engagement with dead contact 14, the filaments 7 and 8 are connected in series across the lines 9 and 10. This will maintain a low level energization of both filaments and consequently provide a minimal output. This maintains satisfactory energization of the headlight to prevent damage reslting from vibration and the like during the operation of the vehicle. The three-position switch unit 13 includes a low beam filament contact 15 connected to the line 9. When the switch arm 12 engages the contact 15, the high beam filament 7 is by-passed and only the filament 8 is connected across the lines 9 and 10. This provides the desired low beam illumination.

The three positioned switch 13 further includes a high beam filament contact 16 shown disposed to the opposite side of the dead contact 14 and interconnected directly to the line 10. When the contact arm 12 is positioned to engage the contact 15, only the filament 7 is connected across the lines 9 and 10.

As previously noted, the energization of the headlight 1 is regulated by the special RMS regulator 6 which incorporates the taillights 2 and 3 to establish energization of the headlight 1 at an essentially constant level.

In the illustrated embodiment of the invention, the taillights 2 and 3 are connected in parallel with each other and define one leg of a resistance bridge network having input terminals a and b connected to the alternator 5 and output or signal terminals c and d. The filaments 17 and 18 of the taillights 2 and 3 are connected in parallel with each other and in series with a resistor 19 between the alternator output lines 9 and 10. The filaments 17 and 18 have an impedance related to the energization current level of the filaments and constitute power sensitive impedance elements providing a signal in accordance with the root mean square of the voltage applied by the alternator to the headlight. As the alternator voltage drops applied across the circuit increases, the temperature of the filaments increases and resistance or impedance of the filaments correspondingly increases. The voltage at the junction of the resistor 19 and the parallel filaments 17 and 18 provides a preselected voltage at the desired output of the alternator. For example, the resistor 19 may be selected to have essentially the same voltage as the paralleled filaments at the desired operating voltage.

A pair of balancing resistors 20 and 21 are connected in series with each other between the alternator output lines 9 and 10. The center connection of the resistors 20 and 21 provides a second voltage point related to the output of the alternator 5.

In the illustrated embodiment of the inventin, an amplifying device is connected across the output of the bridge network. The amplifying device is shown as a PNP transistor 22 having the emitter 23 connected to the junction of the resistor 19 and the paralleled filaments 17 and 18. The base 24 of transistor 22 is connected to the junction of the series-connected resistors 20 and 21. The collector 25 of transistor 22 is connected to control a triggered switch means 26. When the voltage across the filaments 17 and 18 increases to a selected percentage of the alternator output voltage, the transistor 22 is biased "on" and conducts to energize the switch means 26.

The switch means 26 is shown invention, a silicon controlled rectifier 26 having its anode-to-cathode elements connected directly across the output of the alternator 5. When the rectifier 26 conducts, a very low impedance path, which is essentially a short circuit, appears across the output of the alternator 5. In accordance with known theory, the output of the alternator 5 will, therefore, drop to essentially zero for the period of conduction of the rectifier 26. This period of conduction will extend in time past what would be the next polarity reversal of the alternator output. This is caused by the fact that the output impedance of the alternator is primarily inductive. Thus, even though the silicon controlled rectifier controls only one polarity of the output, it can reduce the RMS output well below 50 percent of its normal value. The periodic firing of the controlled rectifier 26 therefore holds the average output of the alternator 5 at a relatively constant level.

Although a highly accurate phase control may not be established, applicant has found that the regulation is highly satisfactory for purposes of controlling the energization of vehicle headlights. A single tail lamp could, of course, be used, or one of the tail lamps substituted for resistor 20. Using tail lamps for two bridge legs would give greater bridge output but would also complicate wiring.

In the illustrated embodiment of the invention, a resistor 27 in series with a diode 28 is connected between the collector 25 of transistor 22 and the gate 29 of the controlled rectifier 26. The anode 30 of the rectifier 26 is connected to the line 9 and the cathode 31 is connected to the line 10. Thus, whenever line 9 is positive with respect to line 10, the rectifier 26 is biased in the direction to conduct. Correspondingly, the voltage dividing network can apply a turn-on signal to the gate 29 during this half cycle if the voltage level sensed by the taillight filaments 17 and 18 indicates an excessive output voltage.

A stabilizing resistor 32 and a paralleled transient by-pass capacitor 33 may be connected across the gate to cathode circuit of the recitifer 26, as illustrated in FIG. 1.

A capacitor 34 may be connected across the alternator 5 and a capacitor 35 may be connected across the filaments 17 and 18 of the taillights 2 and 3. Capacitors 34 and 35 are selected to by-pass ignition noise and the like from the circuit and thus contribute to stable operation.

The operation of the illustrated embodiment is summarized as follows. If the RMS output of alternator 5 rises above a desired level, the voltage appearing across the taillight filaments 17 and 18 increases with a corresponding increased impedance. The voltage applied to the emitter 23 of the transistor 22 therefore increases with respect to the voltage applied to the base 24. During the period that the alternator output line 9 is positive relative to line 10, the voltage applied to the emitter 23 biases the transistor 22 to conduct. At a selected level, the transistor will conduct and completes the circuit from the line 9 through the resistor 19, the emitter to collector path of the transistor 22, the current limiting transistor 27 and the diode 28, and the gate 29 to cathode 31 of the controlled rectifier 26, back to the opposite line 10. The controlled rectifier 26 will therefore conduct and establish a low impedance circuit across the alternator 5. This reduces the output of the alternator 5 and essentially removes the voltage from the headlight 1 and the taillights 2 and 3. The thermal time constant of the taillights 2 and 3 is generally, for commercially available lights, substantially greater than the period of the alternator 5 such that the resistance of the taillight filaments 17 and 18 will not change instantaneously with the changes in the applied voltage, but rather to a very substantial number of complete output cycles of the alternator 5. The filaments 17 and 18 respond sufficiently rapidly to prevent any noticeable visual change in the output of the headlight 1 and the taillights 2 and 3.

Under all three positions of the switch unit 13, the energization voltage of the headlight 1 is maintained at a selected maximum level.

If it is desired to essentially turn off the lighting circuit, a switch means may be provided to reduce and hold the output of the alternator 5 essentially at zero; for example, as shown in FIG. 2.

In FIG. 2, a switch 36 is connected directly in parallel with the resistor 19 to connect the top side of the paralleled filaments and the emitter 23 of transistor 22 directly to line 9. Whenever the alternator 5 goes slightly positive at line 9, the transistor 22 is biased to conduct and fires or triggers the controlled rectifier 26 to establish the short circuit across the alternator 5 for the corresponding polarity portion of the cycle. This, in turn, will essentially maintain the output of the alternator 5 very near zero. Although the opposite polarity portion of the cycle remains, its duration is reduced below one-half the normal period and the energization level is minimal. Further, if considered necessary to remove the opposite half cycle, a bi-lateral controlled rectifier, such as a "Triac" or a pair of back-to-back controlled rectifiers may be provided with appropriate firing means to clip both half cycles in response to the closing of switch 36 and/or the output of the bridge structure or the like.

In FIG. 3, a further modification to the circuit of FIG. 1 is shown wherein the output voltage is reduced with the switch in the "off" position by parallel connection of the headlight filaments to the alternator output lines 9 and 10. Only the portion of the circuit including the modified interconnection of the headlight filaments is therefore shown in FIG. 3, and corresponding elements in FIGS. 1 and 3 are similarly numbered for purposes of simplicity and clarity of explanation. The headlight 1 includes the high beam filament and low beam filament interconnected in series with the center tap connected directly to the line 9. The opposite ends of the filaments 7 and 8 are connected to line 10 through a double pole, double throw, switch unit 37 having a pair of contact arms 38 and 39. The contact arm 38 is shown connected to the outer end of the high beam filament 7 and is selectively engageable with any one of three contacts 40, 41 and 42 which are shown in vertical alignment in FIG. 3. The adjacent upper contact 40 and intermediate contact 41 are interconnected directly to line 10. The lower contact 42 is a dead contact and provides an open circuit connection to the filament. Thus, whenever the contact arm 38 engages either contact 40 or 41, the filament 7 is connected across the alternator output lines 9 and 10.

The associated contact arm 39 similarly selectively engages any one of three contacts 43, 44 and 45. The lower contact 43 and the intermediate contact 44 are both connected to the line 10. The upper contact 45 constitutes the dead contact.

With the switch unit 37 positioned to hold the contact arms 38 and 39 in an intermediate position engaging respectively contacts 41 and 44, the filaments 7 and 8 are connected in parallel with each other between the lines 9 and 10. The resistance of the paralleled filaments 7 and 8 is less than the series resistance and the circuit of FIG. 3, therefore, provides a reduction in the output voltage of the alternator 5 and a corresponding reduction in the illumination.

If the switch unit 37 is moved upwardly, the contact arm 38 engages contact 40 to maintain connection of the filament 7 across the lines 9 and 10. However, the contact 39 simultaneously moves into engagement with the dead contact 45 and thus removes the filament 8 from the circuit. Conversely, movement of the contact arms 38 and 39 in the opposite or downward direction in FIG. 3 removes the filament 7 while maintaining the circuit connection to the filament 8.

The switch 37 of FIG. 3 permits selective interconnection of either filaments 7 and 8 into the circuit for controlled illumination and in the "off" position, connects the filaments 7 and 8 in parallel to minimize the alternator output and illumination level. The circuit otherwise operates in the same manner as that described with respect to FIG. 1.

The parallel, circuit connection of FIG. 3, in combination with the cutoff switch of FIG. 2, reduces the output voltage in the greatest degree.

Although the illustrated embodiments of the invention include unilateral controlled rectifiers, the present invention includes bi-lateral devices, such as "Triac" units or unilateral rectifiers connected to conduct during the alternate half cycles in combination with appropriate gating means to thereby clip such alternate half cycles and provide a regulated output.

The present invention provides a relatively simple and inexpensive RMS voltage regulator for maintaining a relatively constant illumination level.

I claim:

1. A system for regulating the AC power supplied by a source to lighting means, comprising means for varying the flow of AC power from said source to said lighting means, means including a power sensitive impedance having a characteristic which varies with the root mean square voltage applied therein for producing a signal dependent upon the root mean square voltage applied by said source to said lighting means irrespective of substantial variations of frequency, amplitude, waveform and symmetry of the AC power supplied, and means responsive to said signal for controlling said power-flow-varying means to regulate the power supplied to said lighting means.

2. A system in accordance with claim 1 wherein said impedance comprises an incandescent lamp.

3. A system in accordance with claim 2 wherein said lamp is connected in series with resistor means.

4. A system in accordance with claim 1, wherein said power-flow-varying means is a gate-controlled semiconductor switch connected across said source and having the gate thereof responsive to said signal.

5. A system in accordance with claim 4, wherein said signal-responsive means includes means for turning on said semiconductor switch for a portion only of the AC cycle of said source.

6. A system in accordance with claim 4, wherein said semiconductor switch is connected directly across siad source.

7. A system in accordance with claim 1, wherein said signal-responsive means includes means for controlling said power-flow-varying means to limit the power flow to said lighting means when the root mean square voltage applied to said lighting means reaches a predetermined level.

8. A system in accordance with claim 1, wherein said source is an alternator.

9. A system in accordance with claim 8, wherein said alternator is a permanent magnet type.

10. A system in accordance with claim 1, wherein said power sensitive impedance has a time constant long relative to the period of the AC source and is substantially insensitive to source voltage variations of relatively short duration.

11. A system in accordance with claim 1, wherein said signal-producing means comprises a bridge circuit having said power sensitive impedance in one leg thereof, said bridge circuit having an input connected across said lighting means and having an output at which said signal is produced.

12. A system in accordance with claim 11, further comprising means for amplifying the signal at the output of said bridge circuit and for coupling an amplified signal to said power-flow-varying means.

13. A system in accordance with claim 1, wherein said lighting means comprises incandescent lamp means for illuminating night time movement of a vehicle, and means separate from said power sensitive impedance connected to said source for reducing the illumination level of said lamp to a day time level substantially below the illumination level for night time and sufficient to prevent vibration damage of said lamp means.

14. A system in accordance with claim 1, wherein said signal producing means has connecting means for applying to said signal producing means a voltage which is substantially in accord with the voltage applied to said lighting means by said source.

15. A system in accordance with claim 1, wherein the power-flow-varying means is controlled by said controlling means to regulate the power supplied to said lighting means on alternate half-cycles only.

16. A system for regulating the power supplied by a source to a load, comprising a gate-controlled semiconductor switch connected across said source, a bridge circuit having an input connected across said load and including a power sensitive impedance in one of the legs thereof for producing a signal at an output of said bridge circuit dependent upon the root mean square voltage applied by said source to the load, and amplifier means coupling said signal to the gate of said switch for turning on said switch when the signal reaches a predetermined level.

* * * * *